United States Patent Office 3,505,238
Patented Apr. 7, 1970

3,505,238
METHODS AND COMPOSITIONS FOR INHIBITING SCALE IN SALINE WATER EVAPORATORS
Robert W. Liddell, Pittsburgh, Pa., assignor to Calgon Corporation, a corporation of Delaware
No Drawing. Continuation-in-part of application Ser. No. 443,627, Mar. 29, 1965. This application Nov. 4, 1968, Ser. No. 773,276
Int. Cl. C02b 5/06; C23f 14/02
U.S. Cl. 252—180                                25 Claims

ABSTRACT OF THE DISCLOSURE

Salts of amino methylene phosphonates are added to saline water alone or in combination with one or more anti-foam agents, water soluble polymers, tannins, lignins and deaerating materials to inhibit the deposition of scale on saline water evaporators.

This application is a continuation-in-part of my copending application Ser. No. 443,627, filed Mar. 29, 1965 entitled "Inhibition of Scale in Saline Water Evaporators," now abandoned.

This invention relates to methods and compositions for inhibiting scale formation in saline water evaporators. In particular, it relates to the use of certain amino phosphonate compounds therefor and to certain novel compositions including such amino phosphonate compounds, and methods of inhibiting scale formation in saline water evaporators therewith.

The scarcity of fresh water in many parts of the world has greatly increased the development and use of methods of removing salt from sea water, especially in coastal areas. Currently one of the principal methods of purifying sea water is through the use of various saline water evaporators, such as submerged tube evaporators, flash evaporators, thin film distillation evaporators, and other types. Although the use of land-based evaporators is increasing, most sea water distillation continues to take place on shipboard.

Sea water evaporators are subject to scale formation on their heat exchange surfaces, greatly retarding the efficient transfer of heat. Scaled evaporators must be shut down and cleaned, which greatly adds to the cost of purifying the water.

It has been the practice of those skilled in the art to add sodium tripolyphosphate and other molecularly dehydrated phosphates to the sea water to inhibit scale formation on the heat exchange surfaces of evaporators. The molecularly dehydrated phosphates and the polyphosphates are particularly useful for the reason that they actively inhibit in relatively small amounts. See my U.S. Patent 2,782,162.

Molecularly dehydrated phosphates generally work well at lower temperatures, but at the higher temperatures often found in saline brine evaporators, they are not so effective due to thermal decomposition and to the tendency of the water to form different scales at higher temperatures, such as the calcium sulfates, magnesium hydroxide, and the basic magnesium silicates whereas calcium carbonate is the principal scale formed at lower temperatures. The molecularly dehydrated phosphates have not been satisfactory at the higher temperatures presently used in sea water evaporators for the reasons just outlined. As an example, a sea water evaporator operated below 190° F. using a compound containing inorganic molecularly dehydrated phosphates, such as Calgon's "Hagevap," will operate for long periods of time without scaling, however, when operated at 200° F. the same evaporator using the same compound will become so clogged with scale in 4 hours as to become useless and will require hours of manual chipping to clear it. On the other hand, the same evaporator at 200° F. treated by the method and composition of the present invention was operated for 100 hours with no sign of scaling.

It is well known that in fresh water scale-forming compounds can be prevented from precipitating by inactivating their cations with chelating or sequestering agents so that the solubility of their reaction products is not exceeded. Generally, this requires many times as much chelating or sequestering agent as cation, and these amounts are not always desirable or economical. In short, in such sequestering or chelating operations, a stoichiometric amount of sequesterous or chelating agent must be added.

The present invention is based upon the "threshold" phenomenon, which simply stated is a discovery that certain materials will prevent or inhibit precipitation when added in amounts far less than the concentrations required for sequestering or chelating. Generally, the materials which exhibit the "threshold" phenomenon are sequestering agents in large concentrations. However, not all materials which are sequestering or chelating agents exhibit "threshold" characteristics. When a precipitation inhibitor is present in a potentially scale-forming system at a markedly lower concentration than that required for sequestering the scale forming cation, it is said to be present in "threshold" amounts. Generally, sequestering takes place at a weight ratio of threshold active compound to scale-forming cation component of greater than about ten to one, and threshold inhibition generally takes place at a weight ratio of threshold active compound to scale-forming cation component which is only a very small fraction of the amount required for sequestration.

The "threshold" concentration range can be demonstrated in the following manner. When a typical scale-forming solution containing the cation of a relatively insoluble compound is added to a solution containing the anion of the relatively insoluble compound and a very small amount of a threshold active inhibitor, the relatively insoluble compound will not precipitate even when its normal equilibrium concentration has been exceeded. If more of the threshold active compound is added, a concentration is reached where turbidity or a precipitate of uncertain composition results. As still more of the threshold active compound is added, the solution again becomes clear. This is due to the fact that threshold active compounds in high concentrations also act as sequestering agents. Thus, there is an intermediate zone between the high concentrations at which threshold active compounds sequester the cations of relatively insoluble compounds and the low concentrations at which they act as threshold inhibitors. Therefore, one could also define "threshold" concentrations as all concentrations of threshold active compounds below that concentration at which this turbid zone or precipitate is formed.

I have discovered that certain amino compounds having one or more methyl phosphonic acid groups and water soluble salts thereof are active scale inhibitors in the "threshold" concentration range under evaporating conditions. Moreover, these compounds remain effective at the temperatures often found in saline high temperature evaporators, where molecularly dehydrated phosphates rapidly become ineffective.

My invention contemplates preferably the use of compounds of the general formula:

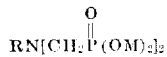

where R is

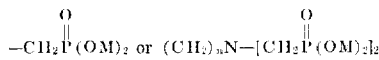

and where $n$ is a whole number from 1 to 3 and M is hydrogen, ammonium, or alkali metal; however, certain divalent metal salts, such as those of zinc, magnesium and calcium are also contemplated as are mixtures of the various salts here listed. In the phrase "where M is selected from the group consisting of hydrogen, ammonium, alkali metal, zinc, magnesium and calcium," I mean to include the various possible mixed salts, for example, where hydrogen and two different alkali metals all appear in the same compound. These compounds may be referred to herein respectively as amino tri (methylphosphonic acid) and water soluble salts thereof, and alkylene diamine tetra (methylphosphonic acid) and its water soluble salts. The alkylene diamine tetra (methylphosphonic acid) type is described by Bersworth in U.S. Patent 2,599,807. I have also found that the diphosphonate compounds of the general formula $$(MO)_2OP\text{---}(CH_2)_n\text{---}PO(OM)_2$$

where $n$ is 1 to 3 and M is an alkali metal, hydrogen or ammonium are also usable and are included herein.

More broadly stated therefor my invention includes the use of compounds of the general formula

where Alk is any alkylene carbon group containing 2 to 6 carbon atoms, R may be a member selected from the group consisting of H, ---CH$_2$COOM and

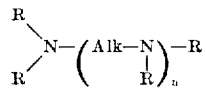

M is a member selected from the group consisting of H and a cation forming a water soluble salt, $n=0$ to 14 provided, however, that where $n=0$ at least one of the radicals represented by R is

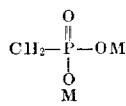

and where $n$ is greater than zero at least ½ of the radicals represented by R are

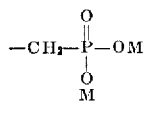

While the amount of inhibitor added to the incoming saline water is a saline water evaporator depends to some extent on the characteristics of the particular evaporator, sea water, and inhibitor used, I have found that about 1 to about 25 p.p.m. of inhibitor based on the saline water is a satisfactory concentration. Still smaller concentrations will produce some effect and larger amounts are effective, but such treatment is too expensive for most uses. There is no reason to believe there is a minimum amount below which the inhibitor is completely ineffective. The compositions herein discussed may be added to the saline water in the evaporator or prior to its introduction thereto.

I have also discovered certain novel compositions which are designed for maximum commercial effectiveness. The compositions I have discovered are particularly useful in inhibiting scale deposition in sea water evaporators. The amino methyl phosphonate compounds of the general formula above may be combined with tannins or lignin sulfonates in weight ratios of up to about 1 to 4, preferably added to the saline water in amounts yielding concentrations of the amino compound of from 1 p.p.m. to about 25 p.p.m. Although the exact structures of the various lignins and tannins are not known and vary somewhat depending on their source, such materials are familiar in the art (see, for example, my U.S. Patent 2,782,162, which may be considered part of this disclosure), and are adequately described for my purposes in terms of the extent of their sulfonation. Alternatively or additionally, up to about 0.4 part by weight of a water-soluble polymer having a molecular weight of at least 50,000 selected from the group consisting of polyacrylic acid, polyacrylamide, and partially hydrolyzed polyacrylamide, may used with one part by weight of the amino methylene phosphonic acid compound, preferably in amounts yielding concentrations of the amino compound of from 1 p.p.m. to about 25 p.p.m. Preferred compositions of this type comprise 1 part by weight amino compound of the above general formula and about 0.02 to about 0.4 parts polyacrylamide having a molecular weight in excess of 500,000 and being hydrolyzed from about 15% to about 55%. Compatible anti-foaming agents and hydrotropic agents are also useful but are by no means essential to the scale inhibiting properties. Generally the hydrotropic and antifoaming agents should be used within their normal range of up to about 25 p.p.m. based on the water treated, but preferably no greater than an amount equal to the weight of the amino methylene phosphate. Total concentration of all additives including the amino methylene phosphonic acid or salt thereof should not exceed about one hundred parts per million parts water. One part of such a composition per million parts of brine produces a significant effect. Smaller amounts are effective to lesser degrees. Any effective amount of any composition recited in this disclosure is contemplated within my invention. Examples of useful hydrotropic agents are xylene sulfonates, naphthalene sulfonates, and toluene sulfonates. Examples of compatible antifoam agents include polyethylene glycol 200 mono-oleate, the monobutyl ether of a mixed polyethylene-polypropylene glycol of a molecular weight of about 3500, and a polyethylene oxide-polypropylene oxide block polymer of a molecular weight of approximately 1000. I have also found that the addition of sodium sulfite in small amounts, approximating 5 to 10% of the composition is highly effective in reducing corrosion and thereby eliminating a source of iron which is very deleterious to successful scale inhibition.

Of the possible compositions included in the above general description, I prefer to use a composition consisting of about 1 part by weight of a compound of the general formula as previously described, preferably amino tri (methylphosphonic acid) or a water soluble salt thereof, about 1 to 4 parts by weight of a sulfonated lignin or tannin, preferably chestnut tannin, and up to about 1 part by weight of an antifoam agent. I prefer to use this composition at a concentration of all the components in the range of about 1 p.p.m. to about 25 p.p.m.

I have performed numerous experiments which demonstrate the effectiveness of the methods and compositions of my invention as measured by the significant improvement in heat exchange efficiency in brine evaporators compared to untreated brine. The improved heat exchange efficiency is due to the greatly reduced amount of scale apparent on the heat exchange surfaces. The result can be appreciated not only in terms of efficiency of heat exchange per se but also in terms of output of distillate.

Results of experiments on a flash evaporator are given in Tables II, III, and IV. In these experiments. I used a laboratory scale flash evaporator having two phases or effects. In phase 1 artificial sea water from a make-up tank was pumped through copper coils in a steam heat exchanger and then flashed. In phase 2 the sea water which did not evaporate on flashing was pumped through another set of copper coils in the same heat exchanger and was again flashed. The temperature of the sea water in both phases was taken immediately before it entered and immediately after it left the heat exchanger. The velocity of the sea water in the copper coil of phase 1 was maintained at 4.0 to 4.2 ft./sec., and the velocity of the sea water in the copper coil of phase 2 was maintained at 3.1 to 3.3 ft./sec. Both copper coils had a 3/16" O.D. and were 105" long. The pressure of the sea water in both effects and the pressure of the steam used in the heat exchanger was controlled by means of manually adjusted pressure regulators. A sufficient amount of sea water to last 3½ hours in the evaporator was made up according to the formulation of Table I.

TABLE I

Sea water formulation contents of a 45-gallon solution with deionized water

Sodium chloride—11.1 lbs.
Magnesium sulfate-7H$_2$O—5.0 lbs.
Calcium chloride (dihydrate)—189.0 gms.
Potassium chloride—132.5 gms.
Sodium bicarbonate—34.5 gms.
Sodium silicate—2.38 gms.
Sodium fluoride—0.84 gms.
Aluminum sulfate-18H$_2$O—0.53 gms.
Disodium phosphate—0.04 gms.

For the length of each run, temperatures, pressures, and flow rates were recorded at 15 minute intervals. Using these data, the heat transfer coefficient (U) in B.t.u./ft.$^2$/hr./° F. for each effect was calculated at three hours after the run had begun. According to the equations which follow, the over-all U values after three hours is the arithmetic mean of the U values for each effect.

$$U = \frac{C_p W \Delta T}{A \Delta T_{L.M.}}$$

where:

U = Over-all heat transfer coefficient (B.t.u./ft.$^2$/hr./° F.)
$C_p$ = Specific heat of sea water (1 B.t.u./lb./° F.)
W = Mass flow rate of sea water (lbs./hr.)
ΔT = Sea water outlet temperature minus sea water inlet temperature (° F.)
A = Area of heat transfer surface (0.29 ft.$^2$)
$\Delta T_{L.M.}$ = Logarithmic mean temperature difference between the steam and the temperature of the sea water from its inlet to outlet (° F.)

TABLE II.—FLASH EVAPORATOR

[Steam pressure, 10 p.s.i.g.]

| Treatment Compound | Treatment Conc., p.p.m. | Over-all U Values After 3 hrs., B.t.u./ft.$^2$/hr./° F. |
|---|---|---|
| N(CH$_2$PO$_3$)$_3$H$_6$ | 1 | 362 |
| N(CH$_2$PO$_3$)$_3$H$_6$ | 2 | 407 |
| N(CH$_2$PO$_3$)$_3$H$_6$ | 10 | 439 |
| N(CH$_2$PO$_3$)$_3$H$_6$ | 10 | 448 |
| N(CH$_2$PO$_3$)$_3$H$_6$ | 15 | 440 |
| N(CH$_2$PO$_3$)$_3$H$_6$ | 20 | 436 |
| N(CH$_2$PO$_3$)$_3$H$_6$ | 25 | 415 |
| Control | | 265 |

TABLE III.—FLASH EVAPORATOR

[Steam pressure, 20 p.s.i.g.]

| Treatment Compound | Treatment Conc., p.p.m. | Over-all U Values After 3 hrs., B.t.u./ft.$^2$/hr./° F. |
|---|---|---|
| N(CH$_2$PO$_3$)$_3$H$_6$ | 5 | 365 |
| N(CH$_2$PO$_3$)$_3$H$_6$ | 10 | 486 |
| N(CH$_2$PO$_3$)$_3$Na$_5$H | 10 | 452 |
| N(CH$_2$PO$_3$)$_3$Na$_5$H | 13 | 386 |
| N$_2$(CH$_2$)$_2$(CH$_2$PO$_3$)$_4$H$_8$ | 10 | 415 |
| N(CH$_2$PO$_3$)$_3$H$_4$Zn | 11.5 | 445 |
| Control | | 305 |

TABLE IV.—FLASH EVAPORATOR

[Steam pressure, 20 p.s.i.g.]

| Treatment Composition | Treatment Conc., p.p.m. | Over-all U Values After 3 hrs., B.t.u./ft.$^2$/hr./° F. |
|---|---|---|
| N(CH$_2$PO$_3$)$_3$H$_6$ / Chestnut tannin | 5 / 10 | 537 |
| N(CH$_2$PO$_3$)$_3$H$_6$ / Chestnut tannin / Naphthalene sulfonate | 7 / 2 / 1 | 488 |
| N(CH$_2$PO$_3$)$_3$H$_6$ / Naphthalene sulfonate | 7 / 7 | 478 |
| N(CH$_2$PO$_3$)$_3$H$_6$ / Lignin pentasulfonate | 5 / 10 | 452 |
| N(CH$_2$PO$_3$)$_3$H$_6$ / Lignin disulfonate | 5 / 10 | 419 |
| N(CH$_2$PO$_3$)$_3$H$_6$ / 35% hydrolyzed polyacrylamide, MW >10$^6$ | 5 / 0.25 | 438 |
| N(CH$_2$PO$_3$)$_3$H$_6$ / Chestnut tannin | 5 / 5 | 373 |
| N(CH$_2$PO$_3$)$_3$H$_6$ / Polyacrylic acid, MW >10,000 | 5 / 0.5 | 391 |
| N(CH$_2$PO$_3$)$_3$HNa$_5$ / Chestnut tannin / Sodium lignin pentasulfonate | 6.5 / 10 / 10 | 385 |
| N(CH$_2$PO$_3$)$_3$NHa$_5$ / Recovered mixed tannin | 6.5 / 20 | 395 |
| N(CH$_2$PO$_3$)$_3$H$_6$ / Mangrove tannin extract | 5 / 20 | 400 |

With steam pressures of 10 p.s.i.g., using chestnut tanning or a spent recovered tanner with N(CH$_2$PO$_3$)$_3$H$_6$, no improvement in over-all heat transfer was recorded after 3 hours. However, the rate of change of the U values at 3 hours was considerably less when these products were used compared to the control. The low slope of the heat transmission curves indicated that they were about to plateau.

It is quite apparent from the tables that there is no minimum concentration below which my treatment will have no effect. As little as one part per million yields significant differences in heat transfer results; even smaller amounts will have some effect which is related to the amount. A plot of the U value improvement curve against concentration will reach zero only at zero concentration.

An entirely different series of experiments (Tables V and VI) was conducted using a submerged tube saline water evaporator. In these experiments steam at 8 p.s.i.g. and 235° F. was passed through a copper coil submerged in a tank maintained at approximately 3000 ml. of sea water. The amount of water boiled away was determined every 15 minutes and at the end of each run the copper coil was weighed, cleaned of all scale with acid, and reweighed in order to determine the amount of scale that had formed. The copper coil was 59" long, ¼" O.D. and had a submerged area of 0.321 sq. ft. Using the data that were collected, average U values were calculated according to the following formula:

$$U = \frac{M\lambda}{A\Delta T}$$

where:

M = Mass of sea water evaporated in 1 hour in pounds
λ = Latent heat of vaporization (970 B.t.u./lb.)
A = Area of heat transfer surface (0.32 ft.$^2$)
ΔT = Difference between steam and sea water temperatures (° F.)

In the experiments tabulated in Tables V and VI, the sea water concentration was allowed to build up to 3 concentrations by evaporation without blowdown. It was maintained at this concentration by blowing down at 15-minute intervals one-half of the quantity of water evaporated during this period. The water evaporated and blowdown was automatically replaced with normal concentration sea water and thereby the concentration was maintained at approximately 3 times normal. This blowdown procedure was continued for one hour to make sure that the apparatus was working satisfactorily. An evaporation test was then run for one hour additional with no blowdown. The values given for the volume evaporated in Tables V and VI are the amounts evaporated during this final one-hour period. The sea water used was the same as that given in Table I, but without sodium silicate, since most submerged tube evaporators are for shipboard use and the silica content of open ocean water is usually low compared to land-based plants. The data given in Tables V and VI may be compared to the results of similar experiments conducted without scale inhibitors present (control experiments) found at the end of each table, thereby demonstrating the effectiveness of my compounds and compositions.

TABLE V.—SUBMERGED TUBE EVAPORATOR

| Treatment Compound | Treatment Conc. (p.p.m.) | Volume Evaporated in 1 hr. (ml.) | Wt. of Scale (gm.) | U at End of Experiment B.t.u./ft.²/hr./°F. |
|---|---|---|---|---|
| $N(CH_2PO_3)_3H_6$ | 10 | 1,350 | 1.4 | 448 |
| $N(CH_2PO_3)_3H_6$ | 25 | 1,500 | 0.7 | 498 |
| Control | | 825 | 4.4 | 274 |

TABLE VI.—SUBMERGED TUBE EVAPORATOR

| Treatment Compound | Treatment Conc. (p.p.m.) | Volume Evaporated in 1 hr. (ml.) | Wt. of Scale (gm.) | U at End of Experiment B.t.u./ft.²/hr./°F. |
|---|---|---|---|---|
| $N(CH_2PO_3)_3H_6$<br>Hydrolyzed polyacrylamide* | 20<br>2 | 1,450 | 1.4 | 481 |
| $N(CH_2PO_3)_3H_6$<br>Hydrolyzed polyacrylamide* | 10<br>2 | 1,550 | 1.3 | 515 |
| $N(CH_2PO_3)_3H_6$<br>Hydrolyzed polyacrylamide* | 10<br>1 | 1,680 | 1.2 | 550 |
| $N(CH_2PO_3)_3H_6$<br>Hydrolyzed polyacrylamide* | 10<br>0.25 | 1,700 | 2.0 | 564 |
| $N(CH_2PO_3)_3H_6$<br>Hydrolyzed polyacrylamide* | 5<br>0.5 | 1,350 | 0.9 | 448 |
| $N(CH_2PO_3)_3H_6$<br>Hydrolyzed polyacrylamide* | 2.5<br>0.25 | 1,550 | 2.9 | 515 |
| $N(CH_2PO_3)_3H_6$<br>Polyethylene glycol 200 mono-oleate | 5<br>0.2 | 1,125 | 0.7 | 375 |
| $N(CH_2PO_3)_3H_6$<br>Polyethylene glycol 200 mono-oleate | 5<br>0.5 | 1,125 | 0.5 | 375 |
| $N(CH_2PO_3)_3H_6$<br>35% Hydrolyzed polyacrylamide, MW 10⁶<br>Polyethylene glycol 200 mono-oleate | 2.5<br>0.25<br>0.2 | 1,550 | 2.2 | 515 |
| $N(CH_2PO_3)_3H_6$<br>Commercial sodium lignin sulfonate<br>Polyethylene glycol 200 mono-oleate | 2.5<br>3.5<br>0.2 | 1,350 | 1.5 | 448 |
| Control | | 825 | 4.4 | 274 |

*The polyacrylamide used varied in hydrolysis to polyacrylic acid between 25 to 40%; viscosity measurements indicated an average molecular weight in excess of 1,000,000.

In addition to these laboratory experiments, I have also conducted several trials in larger pilot plant saline water evaporators operating along the seacoast with natural sea water of which the following is an example:

The evaporator was a regenerative, single-stage flash evaporator operating at a brine temperature of approximately 250° F. The sea water feed to the evaporator averaged about 12 lbs./minute for the length of the run and the distillate rate averaged 5.66 lbs./minute; thus the evaporator was operating at approximately 1.9 concentrations. The data were recorded 1½ hours after the sea water was admitted into the system, and at one-hour intervals thereafter. The values of U were calculated as before described. After 12 hours the evaporator was running smoothly and the U value at a feed of 10 p.p.m. of $N(CH_2PO_3)_3H_6$ based on the feed water was 616 B.t.u./ft.²/hr./° F.; after 36 hours the U value was 576 B.t.u./ft.²/hr./° F., indicating a drop of only 6% during a period of 24 hours. During a similar period on this evaporator, when a standard tripolyphosphate-based saline water scale inhibitor was used, U values dropped 20%. When no inhibitor at all was used, the drop in U values exceeded 50%.

In another small eight-stage sea water evaporator having an initial U value of about 1000 B.t.u./ft.²/hr./° F. at 2500° F. and about two concentrations, it was found that this U value was maintained after 168 hours of operation with a continuous feed of 7.5 p.p.m. of $$N(CH_2PO_3)_3H_6$$

When untreated sea water was used under the same operating conditions, the U value dropped to about 200 B.t.u./ft.²/hr./° F. after only 100 hours.

In a small recovery evaporator working under vacuum at a brine temperature of 140° F., the distillate collected when the evaporator was clean at the rate of about 34 gallons per hour. When continuously fed 7.5 p.p.m. of $N(CH_2PO_3)_3H_6$, this rate was found to drop slowly until a plateau was reached at about 29 gallons per hour, a level maintained for over a week thereafter. The best known inorganic phosphate-based treatment would produce a plateau at 2 or 3 gallons less per hour; under no treatment whatsoever the amount of distillate would continue to drop until acid cleaning was necessary.

I have found that a particularly effective method of treatment for sea water evaporator, especially land based evaporators is to add sufficient sulfuric acid to react with the magnesium in deaerated sea water and maintain a pH at about neutral, i.e., pH 7 or in the range pH 6.7 to 7.3, together with a small amount of sodium sulfite with a cobalt salt such as cobalt chloride as an activator for deaeration of the water, thereby reducing the corrosiveness of the water and resulting iron pick up. The cobalt activator used with the sodium sulfite is present in very small amounts preferably about 100 parts/billion of solution. The addition of threshold amounts of the compositions disclosed herein above containing organic phosphonates to such a system provides an extraordinarily effective treatment for sea water to prevent scale forming, corrosion and the other attendant ills of high temperature sea water evaporators which have been outlined above.

In the following table I illustrate two compositions which have been highly successful in solving the difficult scale inhibiting problem in sea water evaporators at elevated temperatures, particularly above 200° F.

TABLE VII

| Compound #1 | | Compound #2 |
|---|---|---|
| 39% | {Dried pentasodium<br>Tris (methyl phosphonate)} | 29% |
| 3% | GG11 antifoam | 3% |
| 8% | Sodium sulfite, anhydrous | 5% |
| | Polyacrylamide | 3% |

Thus, my invention relates to methods of inhibiting scale formation in saline water evaporators and novel compositions useful therefor.

I do not intend to be limited to the specific examples, compounds, and methods disclosed herein for illustrative purposes. My invention may be otherwise practiced and embodied within the scope of the following claims.

I claim:

1. Method of inhibiting the deposition of scale from saline water onto the heat exchanger surfaces of a saline water evaporator comprising adding to said saline water an effective amount of a water soluble amino compound of the formula $$RN[CH_2\overset{O}{\underset{\|}{P}}(OM)_2]_2$$

where R is selected from the group $$-CH_2\overset{O}{\underset{\|}{P}}(OM)_2 \text{ and } (CH_2)_nN[CH_2\overset{O}{\underset{\|}{P}}(OM)_2]_2$$

and where $n$ is a whole number from 1 to 3 and M is selected from the group consisting of hydrogen, ammonium, alkali metal, zinc magnesium, and calcium.

2. Method of inhibiting the deposition of scale from saline water onto the heat exchange surfaces of a saline water evaporator as claimed in claim 1 comprising adding to said saline water an effective amount of an alkali metal amino tri (methylphosphonate).

3. Method of inhibiting the deposition of scale from saline water onto the heat exchange surfaces of a saline water evaporator comprising adding to said saline water an effective amount of amino tri (methylphosphonic acid).

4. Method of inhibiting the deposition of scale from saline water onto the heat exchanger surfaces of a saline water evaporator as claimed in claim 1 comprising adding to said saline water an effective amount of an alkali metal ethylene diamine tetra (methylphosphonate).

5. Method of inhibiting the deposition of scale from saline water onto the heat exchange surfaces of a saline water evaporator as claimed in claim 1 comprising adding to said saline water an effective amount of ethylene diamine tetra (methylphosphonic acid).

6. Method of claim 1 in which the compound is added in a concentration in the range of about one part by weight per million parts saline water ot about 25 parts by weight per million parts saline water.

7. Composition useful for inhibiting scale deposition in saline water evaporators comprising (a) water soluble amino compound of the formula $$RN[CH_2\overset{O}{\underset{\|}{P}}(OM)_2]_2$$

where R is selected from the group $$-CH_2\overset{O}{\underset{\|}{P}}(OM)_2 \text{ and } (CH_2)_nN[CH_2\overset{O}{\underset{\|}{P}}(OM)_2]_2$$

and where $n$ is a whole number from 1 to 3 and M is selected from the group conssting of hydrogen, ammonium, alkali metal, zinc, magnesium, and calcium, and (b) about one to about four parts by weight composition selected from the group consisting of tannins and sulfonated lignins.

8. Composition of claim 7 including up to about four parts by weight antifoam agent.

9. Composition useful for inhibiting scale deposition in saline water evaporators comprising (a) one part by weight water soluble amino compound of the formula $$R[NCH_2\overset{O}{\underset{\|}{P}}(OM)_2]_2$$

where R is selected from the group $$-CH_2\overset{O}{\underset{\|}{P}}(OM)_2 \text{ and } (CH_2)_nN[CH_2\overset{O}{\underset{\|}{P}}(OM)_2]_2$$

and where $n$ is a whole number from 1 to 3 and M is selected from the group consisting of hydrogen, ammonium, alkali metal, zinc, magnesium, and calcium, and (b) about .02 part to about 0.4 part polyacrylamide having a molecular weight in excess of 500,000 and being hydrolyzed from about 15% to about 55%.

10. Method of claim 1 wherein a composition of the group consisting of tannins and sulfonated lignins is also added in amounts no greater than four times the amino compound and wherein the total amount of additives does not exceed about 100 parts by weight per million parts saline water.

11. Method of claim 1 wherein a water-soluble polymer is also added in amounts no greater than about 0.4 times the weight of said amino compound, said polymer having a molecular weight of at least 50,000 and being selected from the group consisting of polyacrylic acid, polyacrylamide, and partially hydrolyzed polyacrylamide, and wherein the total amount of additives does not exceed about 100 parts by weight per million parts saline water.

12. Composition useful in inhibiting scale deposition in saline water evaporators consisting essentially of (a) chestnut tannin, and (b) a compound selected from the group consisting of amino tri (methylphosphonic acid) and water soluble salts thereof, in a ratio of (a) to (b) of about 1 to 1 to about 4 to 1.

13. Method of inhibiting the deposition of scale from saline water onto the heat exchange surfaces of a saline water evaporator comprising adding to said saline water a composition of claim 12 in an amount providing about one part by weight total additives per million parts by weight saline water.

14. Method of claim 10 wherein a compatible antifoam agent is added in amounts up to about 25 parts by weight per million parts saline water.

15. Method of claim 11 wherein a compatible hydrotropic agent is added in amounts up to about 25 parts by weight per million parts saline water.

16. Method of inhibiting the deposition of scale from saline water onto the heat exchange surfaces of a saline water evaporator comprising adding to said saline water a composition of claim 7 in amounts providing about one part by weight to about 25 parts by weight of said water soluble amino compound per million parts of saline water.

17. Method of inhibiting the deposition of scale from saline water onto the heat exchange surfaces of a saline water evaporator comprising adding to said saline water a composition of claim 9 in amounts of providing about one part by weight of about 25 parts by weight of said water soluble amino compound per million parts of saline water.

18. Method of claim 2 in which the concentration of alkali metal amino tri (methylphosphonate) is in the range of from about one part by weight to about 25 parts per million parts saline water.

19. Method of claim 4 in which the concentration of alkali metal ethylene diamine tetra (methylphosphonate) is in the range of about one part by weight to about 25 parts per million parts saline water.

20. Method of inhibiting the deposition of scale from saline water onto the heat exchange surfaces of a saline water evaporator comprising adding to said saline water an effective amount of a compound selected from the group consisting of amino tri (methylphosphonic acid), alkylene diamine tetra (methylphosphonie acid) in which the alkylene group contains 1 to 3 carbon atoms, and water soluble salts thereof.

21. Method of inhibiting the deposition of scale from saline water onto the heat exchange surfaces of a saline water evaporator comprising adding to said saline water an effective amount of a water soluble compound of the general formula

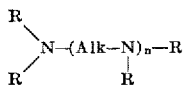

where Alk is any alkylene carbon group containing 2 to 6 carbon atoms, R may be a member selected from the group consisting of H, —CH$_2$COOM and

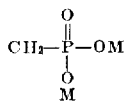

M is a member selected from the group consisting of H and a cation forming a water soluble salt, $n=0$ to 14 provided, however, that where $n=0$ at least one of the radicals represented by R is

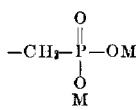

and where $n$ is greater than zero at least one half of the radicals represented by R are

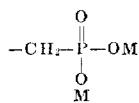

22. Method of inhibiting depositions of scale from saline water as claimed in claim 21 wherein a composition of the group consisting of tannins and lignins is also added in amounts no greater than four times the amino compound.

23. Method of inhibiting depositions of scale from saline water as claimed in claim 21 wherein a water soluble polymer is also added in amounts no greater than about 0.4 times the weight of the amino compound, said polymer having a molecular weight of at least 50,000 and being selected from the group consisting of polyacrylic acid, polyacrylamide, and partially hydrolyzed polyacrylamide, wherein the total amount of additives does not exceed about 100 parts by weight per million parts saline water.

24. A method of inhibiting depositions of scale from saline water as claimed in claim 23 wherein a composition of the group consisting of tannins and lignins is also added in amounts no greater than four times the amino compound together with up to about four parts by weight of an antifoam agent based on the weight of additive solids and up to about 8 parts of sodium sulfite by weight based on the weight of additive solids.

25. Method of inhibiting deposition of scale as claimed in claim 21 wherein the pH is adjusted to about 7 prior to making the addition of amino compound.

References Cited

UNITED STATES PATENTS

| | | | |
|---|---|---|---|
| 2,327,302 | 8/1943 | Dittmar | 252—180 |
| 2,599,807 | 6/1952 | Bersworth | 260—438.1 |
| 2,782,162 | 2/1957 | Liddell | 252—181 |
| 2,980,610 | 4/1961 | Ruchowein | 252—180 |
| 3,288,846 | 11/1966 | Irani et al. | 260—500 |

FOREIGN PATENTS 617,433  3/1961  Canada.

OTHER REFERENCES

Martell et al.—The Chemistry of the Metal Chelate Compound, Prentice Hall (1953), pp. 491–493.

MAYER WEINBLATT, Primary Examiner

W. E. SCHULZ, Assistant Examiner

U.S. Cl. X.R.

21—2.7; 210—59; 252—390

UNITED STATES PATENT OFFICE
CERTIFICATE OF CORRECTION

Patent No. 3,505,238                                            April 7, 1970

Robert W. Liddell

It is certified that error appears in the above identified patent and that said Letters Patent are hereby corrected as shown below:

Column 3, line 67, "is" should read -- in --. Column 4, line 24, after "may" insert -- be --; line 38, "phosphate" should read -- phosphonate --. Column 5, line 4, "experiments." should read -- experiments, --. Column 6, TABLE III, third column, line 4 thereof, "386" should read -- 486 --; same column 6, TABLE IV, first column, line 24 thereof, "$N(CH_2PO_3)_3NHa_5$" should read -- $N(CH_2PO_3)_3HNa_5$ --; same column 6, line 38, "tanning" should read -- tannin --; same line 38, "tanner" should read -- tannin --. Column 8, TABLE VII, third column, line 1 thereof, "29%" should read -- 39% --. Column 9, lines 74 and 75, $$R[NCH_2\overset{O}{\overset{\|}{P}}(OM)_2]_2 \quad \text{should read} \quad RN[CH_2\overset{O}{\overset{\|}{P}}(OM)_2]_2$$

Column 10, line 54, after "amounts" cancel "of"; line 55, "of", first occurrence, should read -- to --.

Signed and sealed this 5th day of January 1971.

(SEAL)
Attest:

EDWARD M. FLETCHER, JR.                              WILLIAM E. SCHUYLER, JR.
Attesting Officer                                              Commissioner of Patents

Dedication 3,505,238.—*Robert W. Liddell*, Pittsburgh, Pa. METHODS AND COMPOSITIONS FOR INHIBITING SCALE IN SALINE WATER EVAPORATORS. Patent dated Apr. 7, 1970. Dedication filed Aug. 9, 1974, by the assignee, *Calgon Corporation*.

Hereby dedicates to the Public the remaining term of said patent.

[*Official Gazette November 12, 1974.*]